US011405096B2

(12) United States Patent
Vivanco et al.

(10) Patent No.: US 11,405,096 B2
(45) Date of Patent: Aug. 2, 2022

(54) SYSTEM AND METHOD TO IMPROVE CARRIER AGGREGATION EFFICIENCY FOR AERIAL USER EQUIPMENT OVER TERRESTRIAL 5G NETWORKS

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); David Ross Beppler, Duluth, GA (US); Slawomir Stawiarski, Carpentersville, IL (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 35 days.

(21) Appl. No.: 16/929,974

(22) Filed: Jul. 15, 2020

(65) Prior Publication Data
US 2022/0021439 A1      Jan. 20, 2022

(51) Int. Cl.
  *H04B 7/185*    (2006.01)
  *H04W 76/10*    (2018.01)
  *H04L 5/00*     (2006.01)
(52) U.S. Cl.
  CPC ......... *H04B 7/18506* (2013.01); *H04L 5/001* (2013.01); *H04W 76/10* (2018.02)

(58) Field of Classification Search
  CPC .............. H04B 7/18506; H04W 76/10; H04W 74/0833; H04W 74/0808; H04W 74/002; H04W 74/02; H04W 76/11; H04W 72/0453; H04L 5/001; H04L 5/0094; H04L 5/0053; H04L 5/0098
  See application file for complete search history.

(56) References Cited

U.S. PATENT DOCUMENTS

| 10,863,525 | B1 * | 12/2020 | Vivanco | H04L 5/006 |
| 2013/0064165 | A1 * | 3/2013 | Chen | H04W 56/0045 370/312 |
| 2017/0325175 | A1 * | 11/2017 | Dinan | H04W 52/265 |

\* cited by examiner

*Primary Examiner* — Hardikkumar D Patel
(74) *Attorney, Agent, or Firm* — Guntin & Gust, PLC; Dana Lemoine

(57) ABSTRACT

A method includes registering, by a primary cell site processor, an unmanned aerial vehicle, receiving, by the primary cell site processor, a list of one or more potential secondary cell sites from the unmanned aerial vehicle, timing advances associated with the one or more secondary cell sites, deriving, by the primary cell site processor, a number of component carriers within each of the one or more potential secondary cell sites, selecting, by the primary cell site processor, one or more secondary cell sites from the one or more potential secondary cell sites, and transmitting, by the primary cell site processor, instructions to the one or more secondary cell sites to provide a component carrier to the unmanned aerial vehicle.

20 Claims, 11 Drawing Sheets

| Cell Group # | # Of Cells In Group | Combined available RF resources | TA | WF |
|---|---|---|---|---|
| A | 5 | 50Mhz | TA.1 | WF.2 |
| B | 1 | 10Mhz | TA.2 | WF.4 |
| C | 10 | 100Mhz | TA.3 | WF.1 |
| D | 2 | 20Mhz | TA.4 | WF.3 |
| E | 1 | 5Mhz | TA.5 | WF.5 |

40

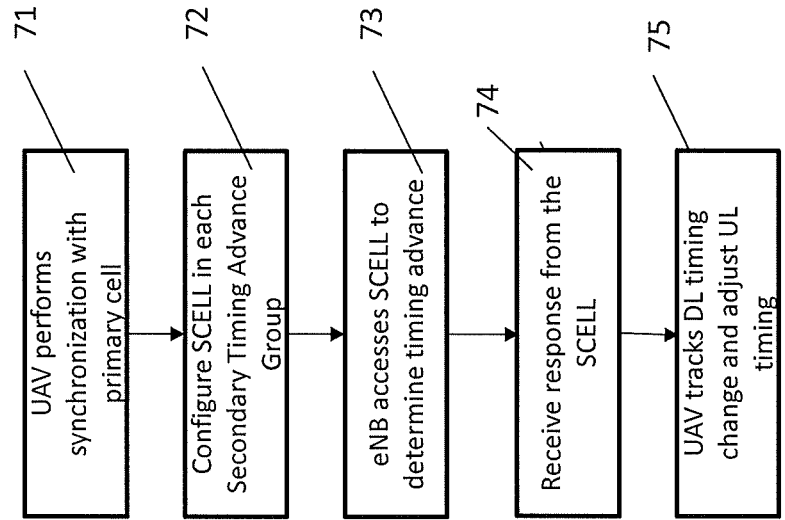

SYSTEM AND METHOD TO IMPROVE CARRIER AGGREGATION EFFICIENCY FOR AERIAL USER EQUIPMENT OVER TERRESTRIAL 5G NETWORKS

TECHNICAL FIELD

This disclosure is directed to systems and methods for existing terrestrial LTE and 5G networks to support unmanned aerial vehicles (UAVs).

BACKGROUND

Many use cases of unmanned aerial vehicles (UAVs) require beyond visual line-of-sight (LOS) communications. Mobile networks offer wide area, high speed, and secure wireless connectivity, which can enhance control and safety of UAV operations and enable beyond visual LOS use cases. While existing LTE networks may support initial UAV deployments, LTE evolution and 5G will provide more efficient connectivity for wide-scale UAV deployments.

One challenge for controlling UAVs with LTE networks is the fact that mobile LTE networks are optimized for terrestrial broadband communication. Thus, eNB antennas are down tilted to reduce the interference power level between adjacent cells. With down-tilted base station antennas, UAVs may be served by the sidelobes of base station antennas or possibly caught in a null. Due to the presence of possible nulls in the sidelobes, and due to the close-to-free-space propagation in the sky, a UAV may detect several eNBs in the area. In general, the higher the altitude of a UAV, the more eNBs the UAV may detect. Moreover, a UAV may detect a stronger signal from a faraway eNB than one that is geographically closer. Hence, it is possible that a UAV may be served by a faraway base station instead of the closest one.

A UAV may require larger bandwidth for its flight data and other applications. In support of those bandwidth requirements, LTE-A and 5G technologies may utilize carrier aggregation techniques and thereby provide a large number of component carriers. In particular, UAVs may use a large number of such component carriers while traversing the terrestrial 4G/5G Network, which in some cases, may exceed thirty-two (32) component carriers for large bandwidth operations. If capable, aerial UEs may try to activate many of these component carriers to satisfy the bandwidth demand. If several of these component carriers are located at different geographic locations, the ability to add component carriers may be limited because of the timing propagation delays associated with different distances from the cell sites.

In view of the foregoing, there is a need to provide a system and method to maximize the number of component carriers available to UAVS.

SUMMARY

The present disclosure is directed to a method including registering, by a primary cell site processor, an unmanned aerial vehicle, receiving, by the primary cell site processor, a list of one or more potential secondary cell sites from the unmanned aerial vehicle, timing advances associated with the one or more secondary cell sites, deriving, by the primary cell site processor, a number of component carriers within each of the one or more potential secondary cell sites, selecting, by the primary cell site processor, one or more secondary cell sites from the one or more potential secondary cell sites using weighting criteria, and transmitting, by the primary cell site processor, instructions to the one or more secondary cell sites to provide a component carrier to the unmanned aerial vehicle. The method may further include grouping the one or more potential secondary cell sites into timing advance groups and wherein the criteria comprises a number of component carriers available in each of the timing advance groups. The criteria may include a total bandwidth available from the number of component carriers and may also include a bandwidth demand of the unmanned aerial vehicle. The method may further include grouping, by the primary cell site processor, the one or more potential cell sites into one or more timing advance group and wherein the selecting step includes selecting the one or more timing advance groups based on the number of component carriers that are available in the one or more timing advance groups. In an aspect, the selecting step may include selecting the one or more timing advance groups based on a total bandwidth available from the number of component carriers.

The present disclosure is also directed to a method including connecting to a primary cell site, transmitting to the primary cell site one or more potential secondary cell sites and the power measured from each of the one or more potential secondary cell sites, forwarding timing advances from each of the one or more potential secondary cell sites to the primary cell site, receiving a selection of one or more secondary cell sites from the one or more potential secondary cell sites, and connecting to the one or more secondary cell sites. The one or more secondary cell sites may be based on inclusion of selected timing advance groups, wherein the selected timing advance groups are based on a number of component carriers associated with each timing advance groups. The selected timing advance groups may maximize the bandwidth associated with a number of component carriers. The method may further include receiving a buffer full message from the primary cell site and identifying one or more potential secondary cell sites responsive to the buffer full message and wherein the one or more secondary sites are grouped based on timing advanced groups.

The present disclosure is also directed to a system including a primary cell site and a plurality of secondary cell sites, an input-output interface in communication with the primary cell site, a processor associated with the primary cell site and coupled to the input-output interface wherein the processor is further coupled to a memory, the memory having stored thereon executable instructions that when executed by the processor cause the processor to effectuate operations including receiving bandwidth demands from an unmanned aerial vehicle, receiving a set of potential secondary cell sites and timing advances associated with the potential secondary cell sites, grouping the set of potential secondary cell sites into timing advance groups, selecting secondary cell sites from the set of potential secondary cell sites, and causing the secondary cell sites to establish communication with the unmanned aerial vehicle. The set of potential secondary cell sites may be determined using power levels reported by the unmanned aerial vehicle associated with each of the potential secondary cell sites. The selecting step may include selecting the secondary cell sites based on the number of component carriers available in each of the timing advance groups or may include selecting the secondary cell sites based on the total bandwidth of component carriers available in each of the timing advance groups. In an aspect, the availability of the potential secondary cell sites is based on a priority level of the unmanned aerial vehicle and the selecting step is based on the availability of the potential secondary cell sites. The operations may further include sending a buffer full message to the unmanned aerial vehicle and the receiving step is performed in response to the buffer full message. The selecting step may maximize the bandwidth available from component carriers associated with the potential secondary cell sites.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 4C is an exemplary flow chart showing the connection of an aerial unmanned vehicle to a primary cell and secondary cells.

DETAILED DESCRIPTION

Figure 1:
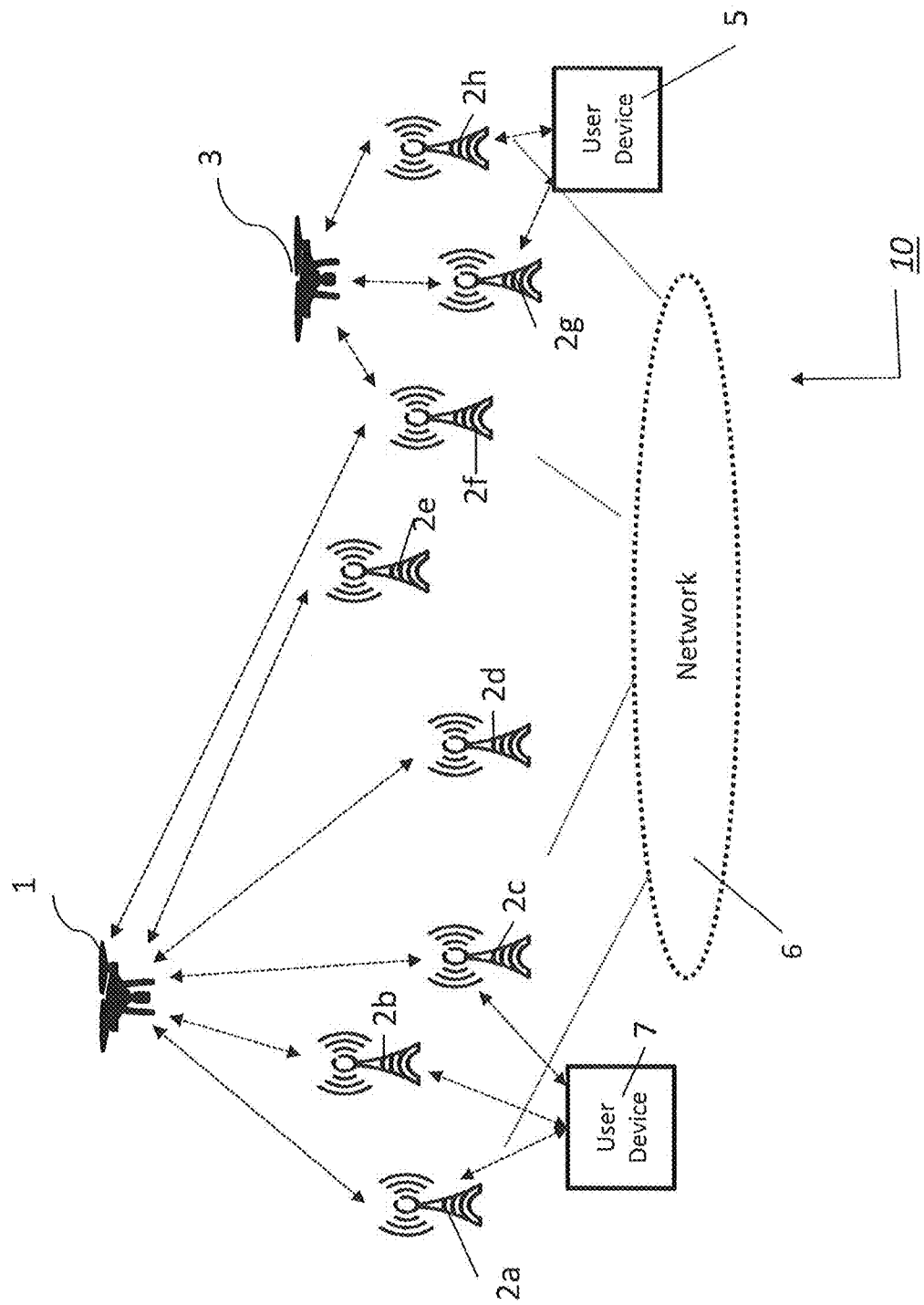
FIG. 1 is a diagram of an exemplary system architecture in accordance with the present disclosure.

System Overview. This disclosure is directed a novel system and method for optimizing the number of component carriers available to a UAV. It should be noted that the terms UAV for unmanned aerial vehicle and aerial user equipment (aerial UE) will be used interchangeably throughout. The generic term UE may be used for either an aerial UE or a terrestrial UE.

Optimizing the number of component carriers may be accomplished by determining the timing advances (TA) for multiple potential cells that are visible to a UAV as it traverses a terrestrial LTE/5G network and adding component carriers based on an analysis of such timing advances as applied to timing advance groups (TAG). A timing advance group consists of one or more serving cells with the same uplink timing advance and same downlink timing reference cell. Each timing advance group contains at least one serving cell with configured uplink, and the mapping of each serving cell to a timing advance group is configured by radio resource control. In the current technology, there is a defined 2-bit Timing Advance Group Identity (TAG Id). This means that an individual UE may configure up to four (4) timing advance groups, 1 primary timing advance group and 3 secondary timing advance groups. It will be noted that advances in technology in which increases in the number of timing advance groups may also use the system and method of the present disclosure to maximize the number of component carriers available to a UAV. As such, carrier aggregation ("CA") capable UAVs may use one or more timing advance groups such that the aggregated bandwidth aligns with the UE demand, quality of service, and other factors.

Carrier aggregation allows service providers to increase the use of available spectrum. Carrier aggregation combines bands of spectrum to create wider channels, producing increased capacity and higher speeds. Carrier aggregation may be configured with multiple carriers of any bandwidth and may include either non-continuous and/or continuous spectrum chunks, in any frequency band. Carrier aggregation may be used in LTE-Advanced networks in order to increase the bandwidth, and thereby increase the bitrate, and is used in both Frequency Division Duplex (FDD) and Time Division Duplex (TDD) modes.

Aerial UEs may use multiple component carriers that are non-collocated for carrier aggregation. Such use of non-collocated component carriers may yield to multiple timing advances for uplink carrier aggregation.

With respect to an aerial UE, the UE may be able to communicate with multiple cell sites, including a primary serving cell and secondary cells. The system and method of the present disclosure includes a methodology for optimizing the process of adding carrier components based on timing advances for aerial UEs which are traversing a terrestrial 4G/5G Network. The system may use aerial UE subscription information to identify the type of aerial UE that is traveling through the network and the capabilities of the aerial UE are reported to the system. The system may also receive bandwidth, priority, quality of service and other information from the aerial UE. The aerial UE may report the reference signal received power (RSRP) of neighboring cells. The system may add a weighting factor to each neighboring cell, wherein the weighting factor is a function of the available secondary timing advance groups, the number of component carrier candidates within each timing advance group, the aerial UE and carrier aggregation capabilities, aerial UE bandwidth demands, component carrier available radio frequency resources, the aerial UE estimated trajectory, and the aerial UE quality of service (QoS). The system then may communicate the weighting factors to the serving cell, and mandate that the serving cell use these weighting factors when deciding which neighboring cells to be added as component carriers. By using the weighting factor, the system can maximize the number of component carriers used in order to support the aerial UE bandwidth demand. As such, the method is embodied in a practical application that advances the state of the technology in the telecommunications sector relating to serving UAVs with a terrestrial LTE/5G network.

Operating Environment. The system and method provided herein allows for the maximization of the use of component carriers on UAVs that are capable of carrier aggregation. With reference to FIG. 1, there is shown an exemplary system 10 in which the present disclosure may be implemented. The system 10 may include terrestrial UEs 5, 7 and UAVs 1, 3 connected to a network 6 which may, for example, be any type of wireless network including, fourth generation (4G)/LTE, LTE-Advanced, fifth generation (5G), and any other wireless communication network. It will be understood by those skilled in the art that while the network 6 may comprise the afore-mentioned networks, a combination of one or more communication networks may be used.

Terrestrial user equipment 5, 7, may, for example, be a smartphone, tablet or personal computer configured with an operating system which may, for example, be one of Apple's iOS, Google's Android, Microsoft Windows Mobile, or any other smartphone operating system or computer operating system or versions thereof. The terrestrial UEs 5, 7 may communicate with each other or with UAVs 1 and 3 through network 6. UAVs 1, 3 may be any type of aerial UEs and used for any purpose, including surveillance, audio/video streaming, weather forecasting, communications nodes, deliveries, and any other purpose.

To communicate through the network 6, the terrestrial UEs 5, 7 and UAVs 1, 3 may have a communication interface for a wireless system, which may, for example, be 4G LTE, and 5G, or any other advanced wireless communication interface as understood by those skilled in the art and described in more detail below.

The terrestrial UEs 5, 7 and aerial UEs 1, 3 may communicate to the network 6 by one or more cell sites labeled 2a through 2h. These sites may, for example, be eNodeBs (eNBs) in a 4G/LTE or 5G network. In the exemplary network architecture of FIG. 1 and shown by dashed lines, terrestrial UE 7 may communicate with network 6 through one of eNB 2a, eNB 2b or eNB 2c. Terrestrial UE 5 may communicate with network 6 through one of eNB 2g or eNB 2h. UAV 1 may communicate with network 6 through one or more of eNB 2a, eNB 2b, eNB 2c, eNB 2d, eNB 2e, or eNB 2f UAV 3, shown at a lower altitude, may be able to communicate with network 6 through one or more of eNB 2f, eNB g, or eNB 2h.

Figure 2:
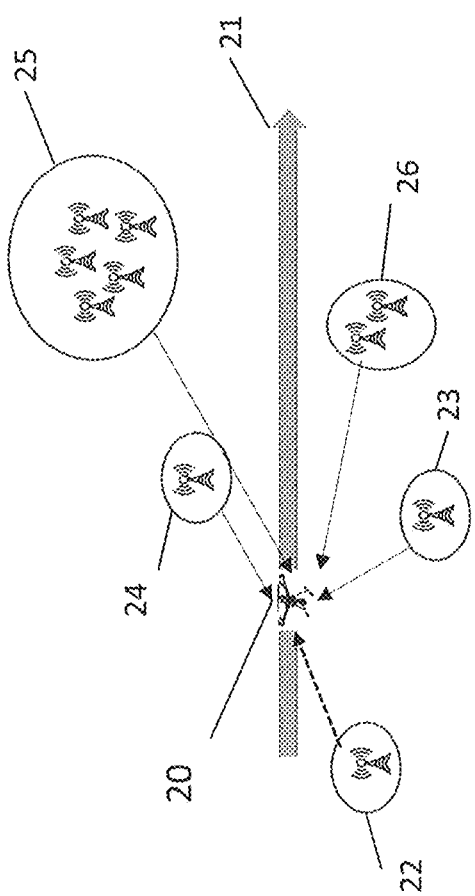
FIG. 2 is a diagram of an exemplary system architecture illustrating the positive effect that weighting may have on the selection of component carriers.

With reference to FIG. 2, there is shown an exemplary block diagram of a UAV 20 traveling from left to right along flight path 21. UAV 20 may detect a large number of component carriers while traveling the terrestrial 4G/5G Network. The UAV may try to activate many component carriers. However, if the component carriers are non-collocated, the limitation on the number of timing advance groups could severely limit the number of component carriers.

In this example, multiple cell sites are grouped in timing advanced groups in accordance with their respective timing advances with respect to the location and travel trajectory of UAV 20. UAV 20 is shown in communication with 22 as the serving cell which may, for example, comprise timing advance group 1. UAV 20 may also be able to establish communications with the various timing advance groups, namely timing advance group 23 comprising one cell, timing advance group 24 comprising one cell, timing advance group 25 comprising 5 cells and timing advance group 26 comprising 2 cells. It will be understood that a timing advance group having multiple cells, such cells may be co-located, or they may be in proximity such that the timing advance for each cell in the timing advance group is compatible with the other cells. Moreover, any one of the cells in a timing advance group may serve as a secondary cell and provide component carriers from each of the other cells in that timing advance group.

Assuming UAV 20 is capable of carrier aggregation, in addition to primary timing advance group 22 having one cell, the UAV may add up to three additional secondary timing advance groups to add component carriers from each to increase the available bandwidth. If the only criteria were to be the distance from the UAV 20 to the timing advance groups, serving cell 22 would communicate with timing advance group 23 with one cell, timing advance group 24 with one cell, and timing advance group 26 with 2 cells. That would provide UAV 20 with a total of four (4) additional component carriers for a total if five (5) component carriers.

In an embodiment, the system may determine in advance of adding the component carriers the number of component carriers in each timing advance group. Accordingly, serving cell 20 may select timing advance group 25 having 5 cells, timing advance group 26 having 2 cells, and timing advance group 23 having 1 cell. As such, a weighting algorithm may increase the number of secondary component carriers available to UAV 20 from four (4) to eight (8), thereby raising the total number of component carriers from five (5) to nine (9).

To achieve this result, the system and method described of the present disclosure will add weighting to the available timing advance groups to maximize the number of component carriers made available to UAV 20. The methodology may use UAV 20 subscription information to identify the type of aerial UE is traveling through the network. Once the UAV is detected and identifies, the terrestrial 4G/5G network requests the aerial UE to identify its carrier aggregation capabilities. When the aerial UE reports the reference signal received power of the of neighboring cells, the system will add a weighting factor to each neighboring cell. The weighting factor may be a function of several data points, including the number of available secondary timing advance groups, the number of component carrier candidates within the same timing advance group, the aerial UE capabilities with respect to carrier aggregation, the aerial UE's bandwidth demand, the available RF resources of the carrier components, the aerial UE estimated trajectory, and the UE quality of service (QoS).

With respect to the data points for the weighting factor, the number of available timing advance groups may vary by a function of altitude and distance of the UAV. The UAV (the current technology) is limited to three additional timing advance groups—though that number may increase in future network releases—meaning that any number greater than three may be subject to a weighting algorithm. Because there is a limit to the number of advance timing groups, the number of component carriers within each timing advance group may be involved in the weighting such that the more component carriers within a particular timing advance group, the heavier that particular timing advance group will be weighted.

The UAV carrier aggregation capabilities may be factored into the weighting algorithm. If the UAV does not have CA capabilities or is otherwise limited, then any weighting factor must consider the limitations of the UAV in this regard. The UAV bandwidth demand may also be considered in the weighting function. Higher bandwidth demands will cause the timing advance groups with the higher number of component carriers to be weighted more heavily. Conversely, with lower bandwidth demands from the UAV, the algorithm may weigh the various timing advance groups more equally and the decision as to which timing advance groups to add may be more of a function of distance and/or signal strength than the number of component carriers available in a particular timing advance group.

The availability of the RF resources in a timing advance group will also be a factor. For example, if there is a higher priority use of the RF resources in a particular timing advance group, then that timing advance group may be weighted less than another timing advance group in which the UAV has higher or equal priority. This may occur, for example, in a case in which a UAV taking videos for a news outlet over an emergency site has a lower priority than a UAV being used by first responders in that emergency. The weighting algorithm will prioritize the RF resources for the first responders over the news outlet.

The trajectory of the UAV may also be considered in the weighting function. For a UAV traveling east to west, component carriers in an advance timing group that are further west and in the direction the UAV is traveling may be given a higher weight than component carriers in an advance timing group that is further east and from which the UAV is traveling. For example, a geographically closer timing advance group may be given less weight if the UAV is traveling away from that timing advance group than a geographically further timing advance group that is being approached by the UAV.

Quality of service may also be considered in the weighting function. Wireless operators may commit to a certain minimum quality of service and therefore will prioritize the resources to those UAVs having a higher quality of service.

In an aspect, the weighting factor may be determined by the serving cell or by an edge processor. The serving cell uses these weighting factors when deciding which neighboring cell to be added as component carriers. The weighting factors are used to maximize the number of component carriers in order to support the aerial UE bandwidth demand.

Figure 3A:
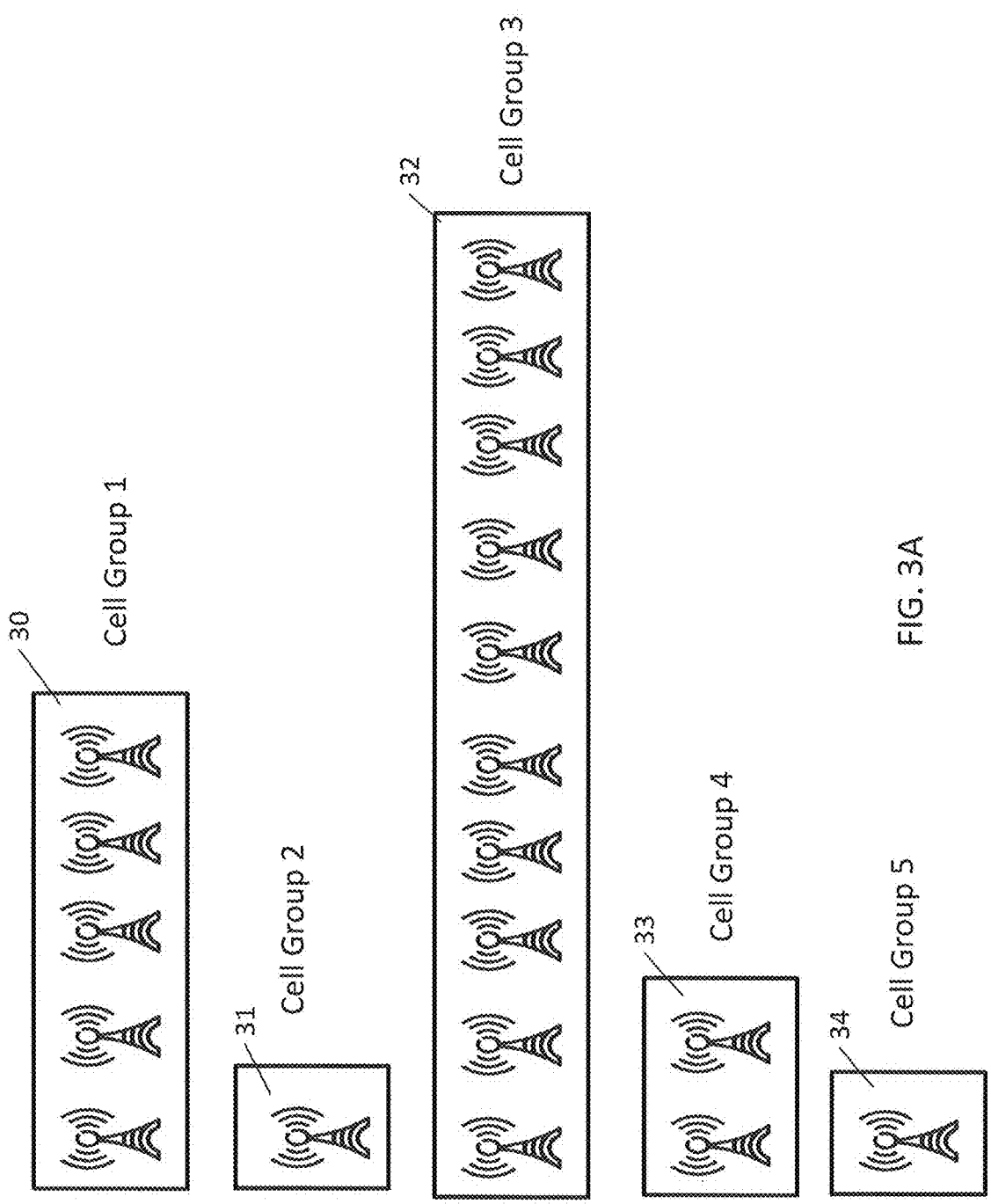
FIG. 3A is an exemplary diagram showing various number of cells in different timing advance group

With respect to FIG. 3A, there is shown an exemplary configuration of multiple potential secondary cell groups, including cell group A 30 having 5 cells, cell group B 31 having 1 cell, cell group C having 10 cells, cell group D having 2 cells, and cell group E having 1 cell.

Figure 3B:
FIG. 3B is an exemplary table showing some parameters and subsequent weighting of timing advance groups.

FIG. 3B shows this information in the first two columns of the table. Column three shows the available aggregate RF bandwidth associated with each cell group. The timing advance group in column four indicates the cell group number from FIG. 3. The fifth column indicates the relative weighting factors (WF) for each of the timing advance groups, with the highest weighting identified as WF.1 and the lowest weight identified as WF.5.

In this example, timing advance group 3 (TA.3) corresponding to cell group 3) will be weighted the most with weighting factor (WF.1). This is because with the ten cells and an aggregate bandwidth of 100 MHz, TA.3 provides the most available potential component carriers and highest potential aggregate bandwidth. Timing advance group one (TA.1) has the second highest weight with 5 component carriers and an available RF bandwidth of 50 MHz. Timing advance group 4 (TA.4) has the third highest weights with 2 component carriers and an aggregate available RF bandwidth of 20 MHz. Based on the weighting factors, TA.3, TA.1, and TA.4 would be selected in that order as the secondary timing advance groups, adding an additional sixteen (16) compound carriers to those associated with the primary timing advance group.

Carrier aggregation is triggered at the UE level. If the serving cell does not have enough resources to satisfy UE demand, UE-Buffer at the serving cell may fill and may exceed a predefined threshold value (CA.BUFFER-.THRES). If this happens, then the serving cell will respond by triggering carrier aggregation for the UE.

The serving cell where the aerial UE receives its system information from is called primary cell (PCELL) while every other configured carrier is a secondary cell (SCELL). PCELL is responsible for cross-carrier scheduling of the SCELLS. The PCELL is scheduled through its own physical downlink control channel (PDCCH). SCELL may be co-located with PCELL i.e., in the same eNB, or may be non-co-located, i.e., different eNBs, The use of multiple timing advances is required for the support of non-collocated cells with carrier aggregation.

Once the PCELL is obtained, the UE will then synchronize to the SCELL of the other site(s). In an aspect, the PCELL eNB will request a radio access channel (RACH) on the SCELL immediately after SCELL activation. The RACH request is then sent to the UAV by PDCCH signaling from the PCELL.

If a TAG contains the PCELL, it is referred to as the primary timing advance group (pTAG). If a TAG contains only SCELL(s), it is denoted as the secondary timing advance group (sTAG). There is one timing reference cell and one-time alignment timer (TAT) per TAG, and each TAT may be configured with a different value. For the, the PCELL is used as the timing reference cell, whereas for sTAG, the UE may use any activated SCELL from the same sTAG as the timing reference cell.

Figure 4A:
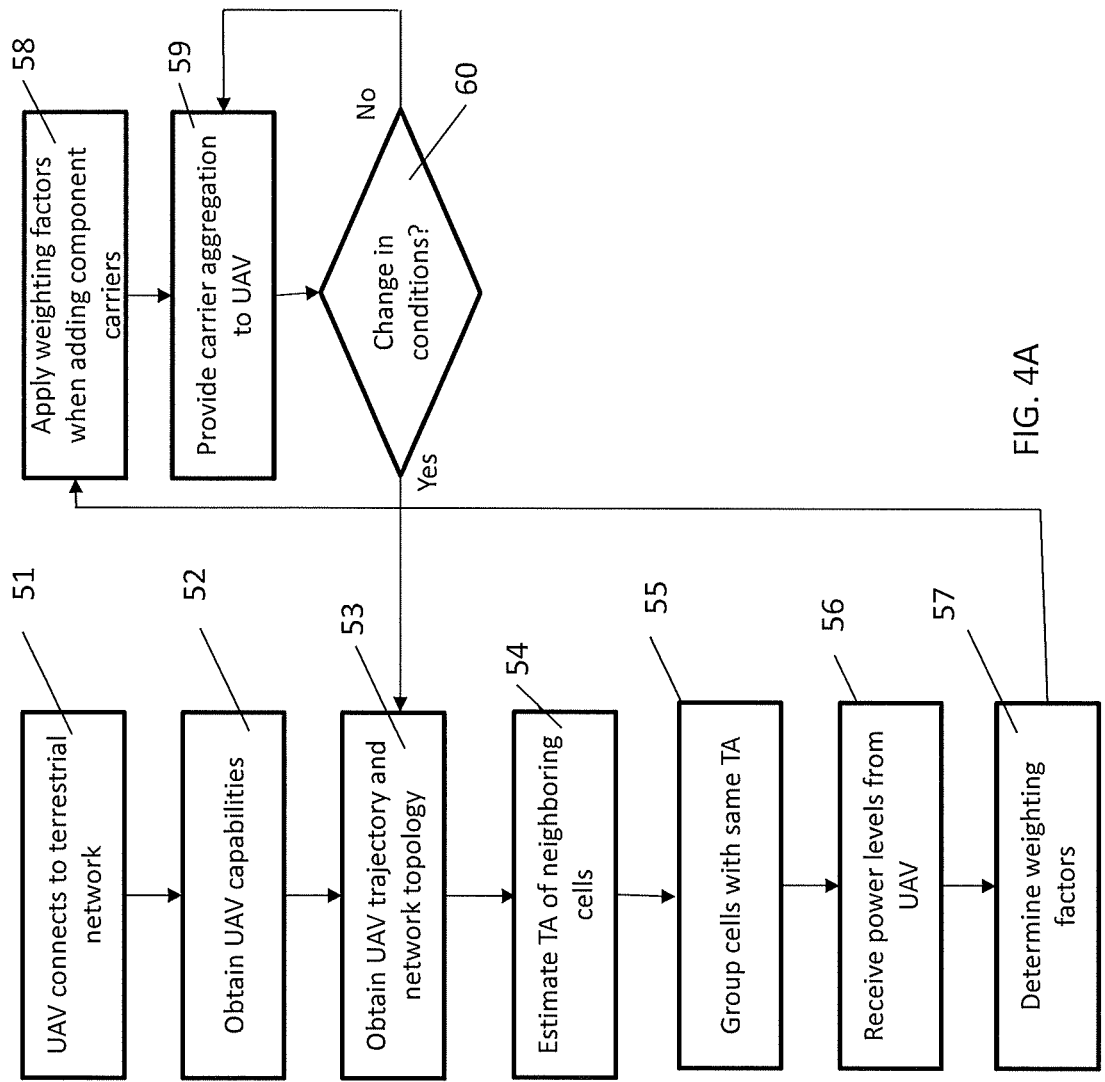
FIG. 4A is an exemplary flow chart showing a method of maximizing component carriers from the perspective of a primary serving cell.

Methods of Use. With reference to FIG. 4A, there is shown an exemplary flow diagram of processing by a system constructed in accordance with the present disclosure. At 51, a UAV connects to a terrestrial network. The network may be a 4G/LTE or a 5G network or any advanced network. The UAV subscription information may be learned based on the registration and connection processes. At 52, the UAV capabilities with respect to carrier aggregation are obtained. Other obtained information may include UAV bandwidth demand, quality of service, priority, and other information which may be relevant to the weighting function. At 53, the UAV's trajectory is learned, along with the network topology in communication range of the UAV. At 54, the estimate of timing advances for each of the neighboring cells is calculated. At 55, the cells with the same timing advance are groups into timing advance groups. At 56, the reference signal received power of the neighboring cells is sent from the UAV to the serving cell. At 57, the serving cell or another edge processing device computes the weighting factors. At 58, the weighting factors are applied to determine which timing advance groups and associated component carriers may be assigned as secondary timing advance groups. At 59, the carrier aggregation is provided to the UAV and to the secondary timing advance groups to provide the UAV bandwidth demands in accordance with the weighting factors. At 60, the system monitors the UAV traversing the network for any changes. If there are no changes, the process continues at 59 with the component carriers being used by the UAV remaining unchanged. If there are changes, which may, for example, be an increase in UAV speed, direction, altitude, or alternatively, a change in the availability of component carriers, then the system returns to 53 where the new UAV trajectory, speed, altitude and/or the network topology is assessed and obtained.

Figure 4B:
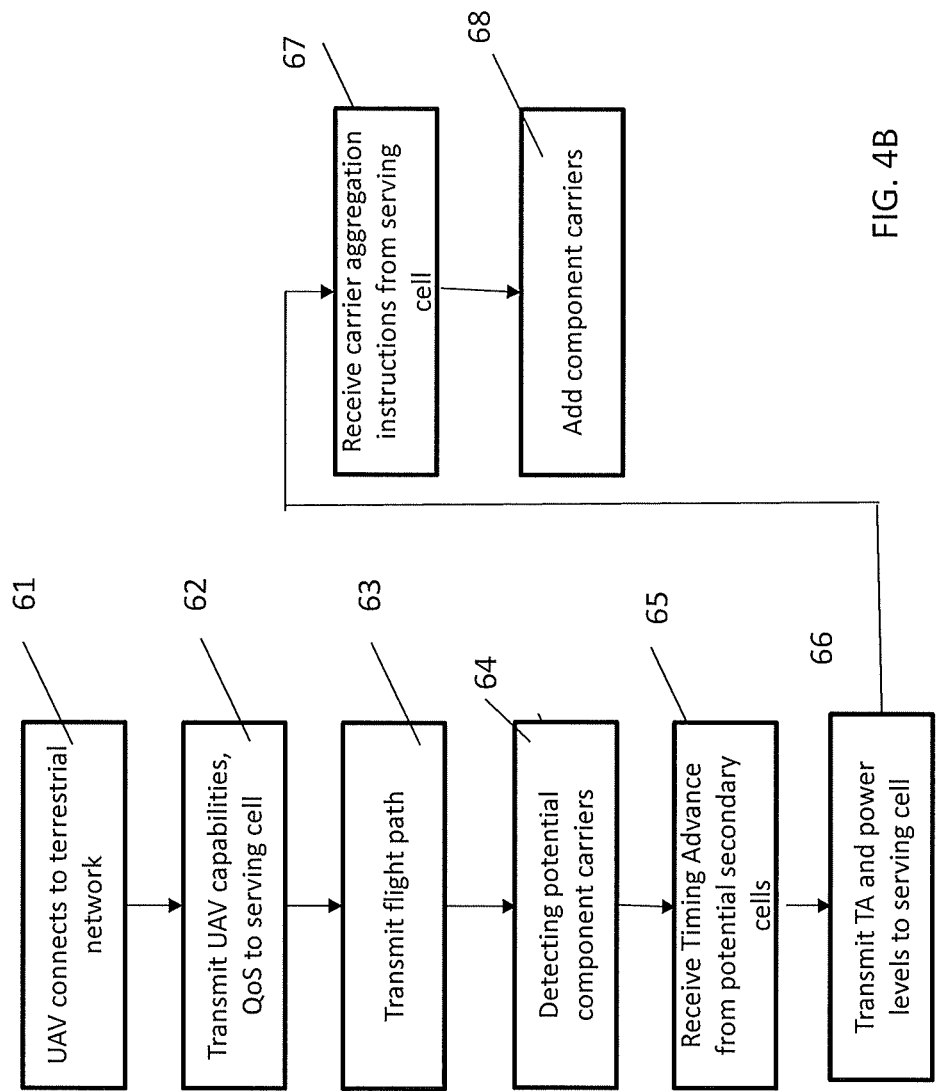
FIG. 4B is an exemplary flow chart showing a method of maximizing component carriers from the perspective of an aerial unmanned vehicle.

With reference to FIG. 4B, there is shown an exemplary flow diagram from the perspective of a UAV. At 61, the UAV connects to a terrestrial network. At 62, the UAV transmits its carrier aggregation capabilities and other information to the serving cell. The other information may be bandwidth demands, quality of service, or other parameters. At 63, the trajectory, which may, for example, include flight path, speed, direction, altitude or other data and the network topology as viewed by the UAV is sent to the serving cell. At 64, the potential component carriers are detected. At 65, the timing advances from those potential component carriers are received. At 66, those timing advances, along with the measured power levels, are sent to the serving cell. At 67, the carrier aggregation instructions are received from the serving cell based on the weighting factors as applied by the serving cell. At 68, the component carriers are added.

With reference to FIG. 4C, there is shown an exemplary method by which a UAV may connect to a PCELL and one or more SCELLS. At 71, the UAV first performs synchronization to PCELL. From there, the UAV will synchronize with the SCELL(s) in each secondary timing advance group. At 72, the SCELL(s) in each secondary timing advance group are configured. The SCELL(s) in a secondary timing advance group may be configured with RACH resource. At 73, the eNB requests RACH access on the SCELL to determine timing advance. This may be performed by the PCELL initiating the RACH transmission on the SCELL by sending a PDCCH signaling from the PCELL. At 74, the response from the SCELL with the timing advance is received. The message in response to a SCELL preamble is transmitted on the PCELL-UL using radio access-radio network temporary identification (RA-RNTI) that conforms to 3GPP Release 8. At 75, if the SCELL is selected to supply component carrier(s), the UAV will track the downlink frame timing change of the SCELL and adjust the uplink transmission timing following the timing advance commands from the eNB.

In order to allow multiple timing advance commands, the relevant MAC timing advance command control element has been modified. The control element consists of a new 2-bit Timing Advance Group Identity (TAG Id) and a 6-bit timing advance command field (unchanged compared to 3GPP Release 8). The Timing Advance Group containing the PCell has the Timing Advance Group Identity 0.

The above examples show the weighting algorithm for a single UAV and the timing advance groups that the single UAV can see and use the RF resources available to add component carriers. It will be understood that there may be other UAVs competing for the same or similar type of resources and those resources may be scared. As such, it is possible that for any given UAV at any point in time, the maximum amount of component carriers may not be available for that particular UAV at the moment. Nevertheless, the system and method of the present disclosure will still maximize those component carriers to the extent that they are available for assignment and use by the UAV.

Network Description. The system and method of the present disclosure may be implemented in a 4G/LTE, LTE-A, or 5G network or another advanced network. In the 5G context, the system and method of the present disclosure may be implemented and offered by operators to customers as part of 5G slices.

Figure 5:
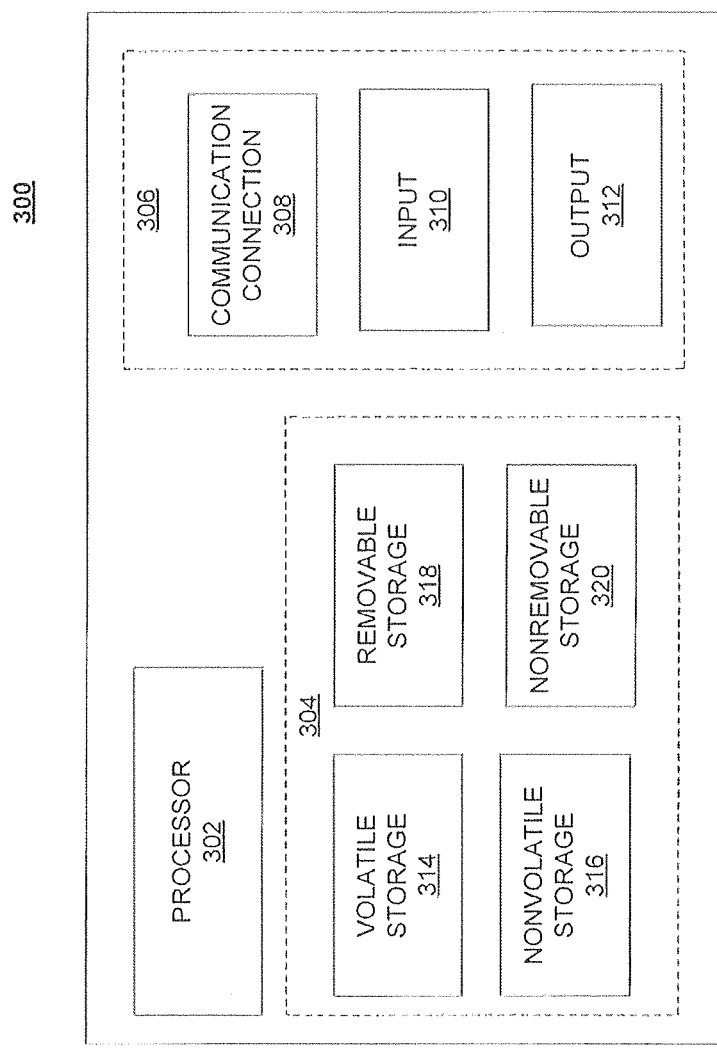
FIG. 5 illustrates a schematic of an exemplary network device.

FIG. 5 is a block diagram of network device 300 that may be connected to the network described in FIG. 1 or which may be a component of such a network. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communication (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
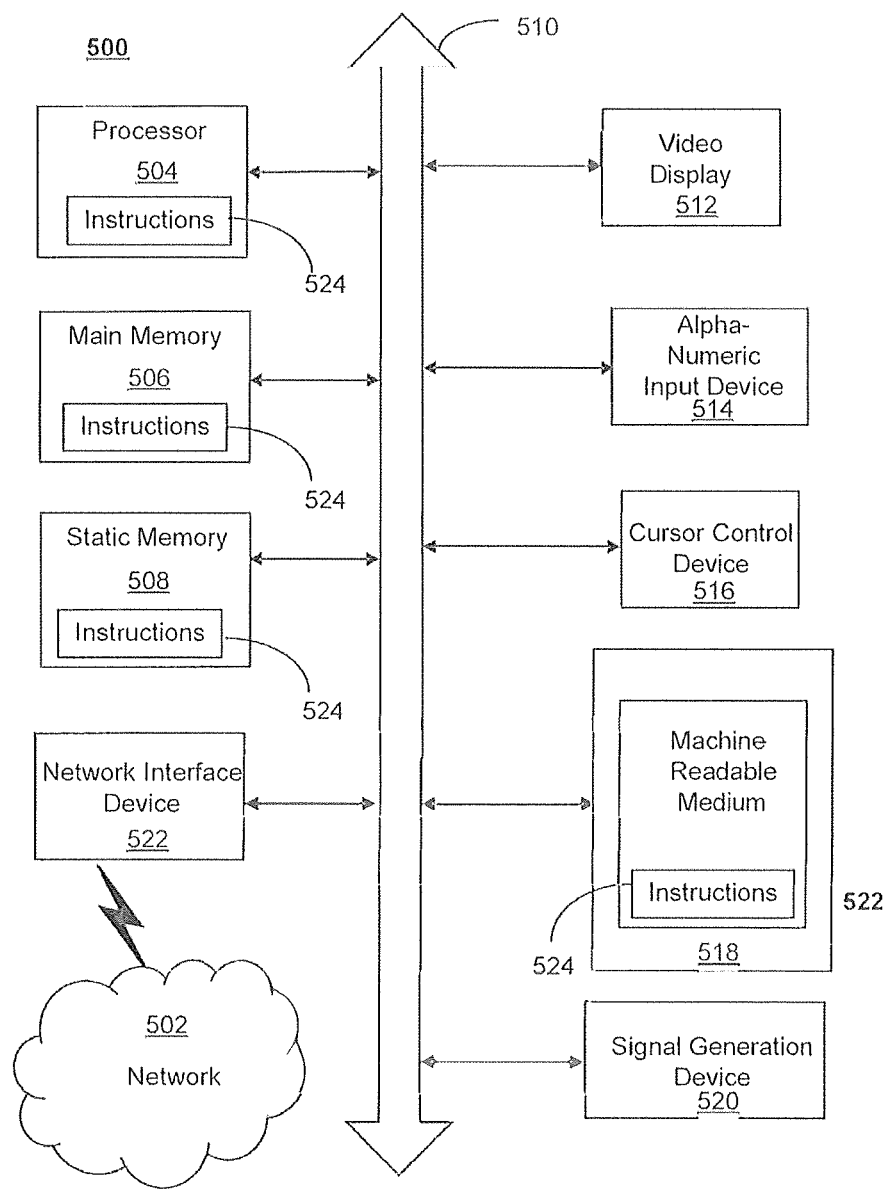
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, server 112, mobile device 101, in 102, MME 103, and other devices of FIG. 1 and FIG. 2. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, internet of things (IOT) device (e.g., thermostat, sensor, or other machine-to-machine device), or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7:
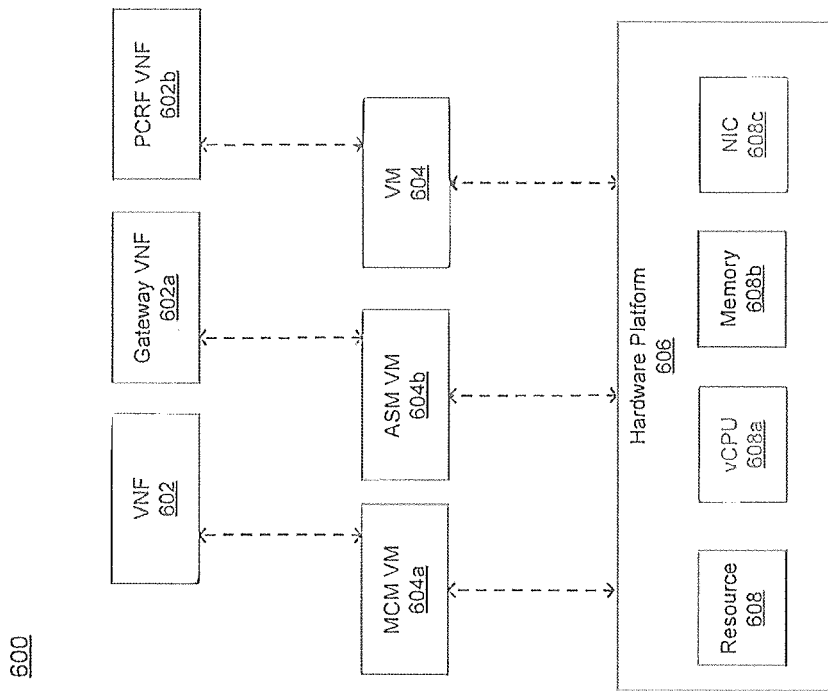
FIG. 7 is a representation of an exemplary network.

FIG. 7 is a representation of an exemplary network 600. Network 600 (e.g., network 111) may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 7 illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 7 illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 8:
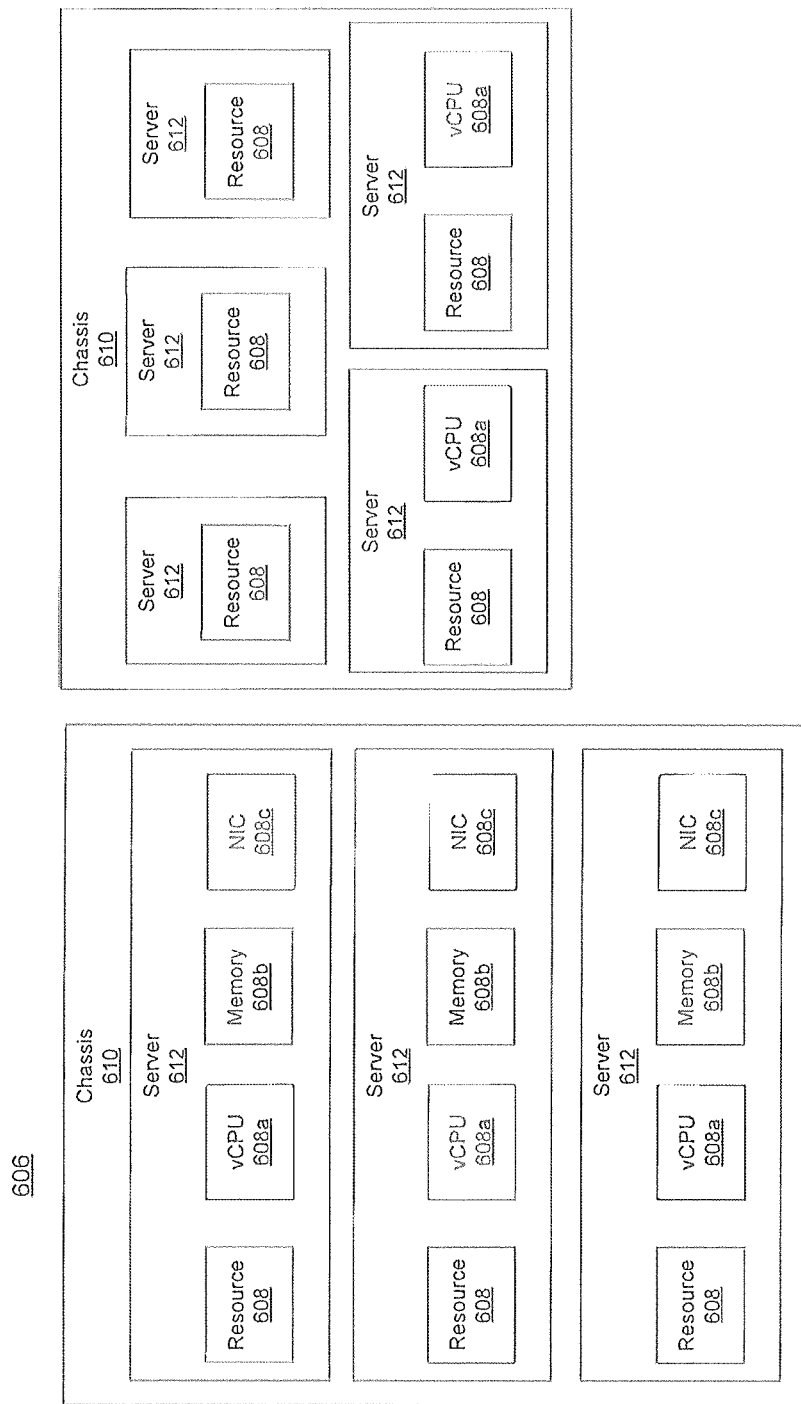
FIG. 8 is a representation of an exemplary hardware platform for a network.

While FIG. 7 illustrates resources 608 as collectively contained in hardware platform 606, the configuration of hardware platform 606 may isolate, for example, certain memory 608c from other memory 608c. FIG. 8 provides an exemplary implementation of hardware platform 606.

Hardware platform 606 may comprise one or more chasses 610. Chassis 610 may refer to the physical housing or platform for multiple servers or another network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally, or alternatively, chasses 610 may be communicatively coupled together (not shown) in any combination or arrangement.

The characteristics of each chassis 610 and each server 612 may differ. For example, FIG. 8 illustrates that the number of servers 612 within two chasses 610 may vary. Additionally, or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to resources 608 may be constrained by one or more rules. For example, a first rule may require that resources 608 assigned to a VM 604 be on the same server 612 or set of servers 612. For example, if VM 604 uses eight vCPUs 608a, 1 GB of memory 608b, and 2 NICs 608c, the rules may require that all these resources 608 be sourced from the same server 612. Additionally, or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used, or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   registering, by a primary cell site processor, an unmanned aerial vehicle on a flight path;
   receiving, by the primary cell site processor, a list of one or more potential secondary cell sites from the unmanned aerial vehicle, and timing advances associated with the one or more potential secondary cell sites;
   determining, by the primary cell site processor, a number of component carriers within each of the one or more potential secondary cell sites;
   selecting, by the primary cell site processor, one or more secondary cell sites from the one or more potential secondary cell sites using weighting criteria, wherein the weighting criteria is based at least in part on locations of the one or more potential secondary cell sites relative to the flight path of the unmanned aerial vehicle; and
   transmitting, by the primary cell site processor, instructions to the one or more secondary cell sites to provide a component carrier to the unmanned aerial vehicle.

2. The method of claim 1 wherein the method further comprises grouping the one or more potential secondary cell sites into timing advance groups and wherein the weighting criteria comprises a number of component carriers available in each of the timing advance groups.

3. The method of claim 2 wherein the weighting criteria comprises a total bandwidth available from the number of component carriers.

4. The method of claim 3 wherein the weighting criteria comprises a bandwidth demand of the unmanned aerial vehicle.

5. The method of claim 1 further comprising grouping, by the primary cell site processor, the one or more potential secondary cell sites into one or more timing advance groups.

6. The method of claim 5 wherein the selecting step comprises selecting the one or more timing advance groups based on a number of component carriers that are available in the one or more timing advance groups.

7. The method of claim 5 wherein the selecting step comprises selecting the one or more timing advance groups based on a total bandwidth available from the number of component carriers.

8. A method comprising:
   connecting, by a processing system including a processor an unmanned aerial vehicle, to a primary cell site, the unmanned aerial vehicle having a flight trajectory including a direction and velocity;
   transmitting, by the processing system, to the primary cell site, the direction and velocity of the flight trajectory of the unmanned aerial vehicle;
   transmitting, by the processing system, to the primary cell site one or more potential secondary cell sites and a power measured from each of the one or more potential secondary cell sites;
   forwarding, by the processing system, timing advances from each of the one or more potential secondary cell sites to the primary cell site;
   receiving, by the processing system, a selection of one or more secondary cell sites from the one or more potential secondary cell sites, wherein the one or more secondary cell sites are reachable from the flight trajectory; and
   connecting, by the processing system, to the one or more secondary cell sites.

9. The method of claim 8 wherein the one or more secondary cell sites are based on inclusion of selected timing advance groups.

10. The method of claim 9 wherein the selected timing advance groups are based on a number of component carriers associated with each timing advance groups.

11. The method of claim 10 wherein the selected timing advance groups maximizes bandwidth associated with a number of component carriers.

12. The method of claim 8 further comprising receiving a buffer full message from the primary cell site and identifying one or more potential secondary cell sites responsive to the buffer full message.

13. The method of claim 12 wherein the one or more secondary cell sites are grouped based on timing advance groups.

14. A system comprising:
a processor associated with a primary cell site; and
a memory coupled to the processor, the memory having stored thereon executable instructions that when executed by the processor cause the processor to effectuate operations comprising:
receiving bandwidth demands from an unmanned aerial vehicle;
receiving information describing a flight path of the unmanned aerial vehicle;
receiving a set of potential secondary cell sites and timing advances associated with the set of potential secondary cell sites;
grouping the set of potential secondary cell sites into timing advance groups;
selecting a plurality of secondary cell sites from the set of potential secondary cell sites based at least in part on locations of the plurality of secondary cell sites relative to the flight path of the unmanned aerial vehicle; and
causing the plurality of secondary cell sites to establish communication with the unmanned aerial vehicle.

15. The system of claim 14 wherein the set of potential secondary cell sites is determined using power levels reported by the unmanned aerial vehicle associated with each of the potential secondary cell sites.

16. The system of claim 14 wherein the selecting step further comprises selecting the plurality of secondary cell sites based at least in part on the number of component carriers available in each of the timing advance groups.

17. The system of claim 14 wherein the selecting step further comprises selecting the plurality of secondary cell sites based at least in part on the total bandwidth of component carriers available in each of the timing advance groups.

18. The system of claim 17 wherein availability of the potential secondary cell sites is based on a priority level of the unmanned aerial vehicle and the selecting step is based at least in part on the availability of the potential secondary cell sites.

19. The system of claim 14 wherein the operations further comprise sending a buffer full message to the unmanned aerial vehicle and the receiving step is performed in response to the buffer full message.

20. The system of claim 14 wherein the selecting step maximizes the bandwidth available from component carriers associated with the potential secondary cell sites.

* * * * *

UNITED STATES PATENT AND TRADEMARK OFFICE
CERTIFICATE OF CORRECTION

| | | |
|---|---|---|
| PATENT NO. | : 11,405,096 B2 | |
| APPLICATION NO. | : 16/929974 | |
| DATED | : August 2, 2022 | |
| INVENTOR(S) | : Daniel Vivanco et al. | |

It is certified that error appears in the above-identified patent and that said Letters Patent is hereby corrected as shown below:

In the Specification

Column 11, Line 44, --IOT-- should be inserted in place of "JOT".

Signed and Sealed this
Sixth Day of September, 2022

Katherine Kelly Vidal
Director of the United States Patent and Trademark Office